United States Patent [19]

Nichols

[11] Patent Number: 4,458,801
[45] Date of Patent: Jul. 10, 1984

[54] METHOD AND APPARATUS FOR CHANGING THE ORIENTATION OF CANS

[75] Inventor: Charles R. Nichols, Golden, Colo.
[73] Assignee: Ball Corporation, Muncie, Ind.
[21] Appl. No.: 464,127
[22] Filed: Feb. 4, 1983
[51] Int. Cl.³ .................. B65G 47/24; B65G 11/00
[52] U.S. Cl. .................................. 193/46; 221/172
[58] Field of Search ................... 193/46; 198/417; 221/172, 312 R

[56] References Cited

U.S. PATENT DOCUMENTS 1,193,624 8/1916 Small .
1,436,549 11/1922 Tibbits .
2,097,368 10/1937 Frank .
2,529,603 11/1950 Galt .
2,800,211 7/1957 Madden .

Primary Examiner—Jeffrey V. Nase

[57] ABSTRACT

A can twist is provided for changing the orientation of cans in a conveying system with each can having a leading side and a trailing side as it passes through the can twist. The guide rails for the open and closed ends of the cans are located so that only the trailing side of each can contacts the guide rails. Such contact is, at any one time, substantially a point contact of the open end and its guide rail and substantially a point contact of the closed end and its guide rail. This is accomplished by providing a plurality of frame members and guide rails with each frame member having two short sides and two long sides and securing the guide rails for the open end and the closed end at a location spaced from the center of each short side.

20 Claims, 9 Drawing Figures

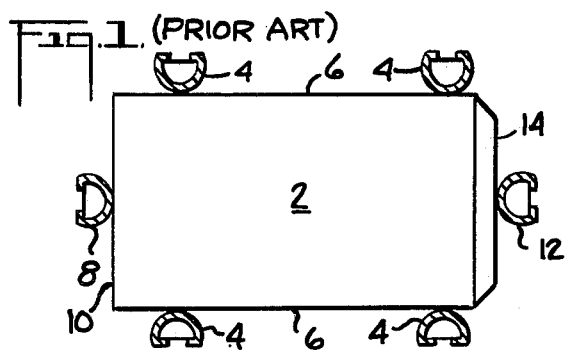
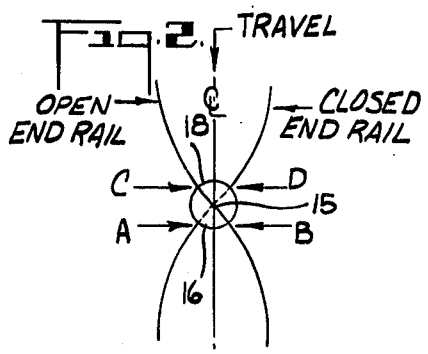
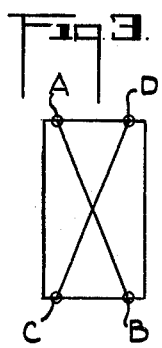
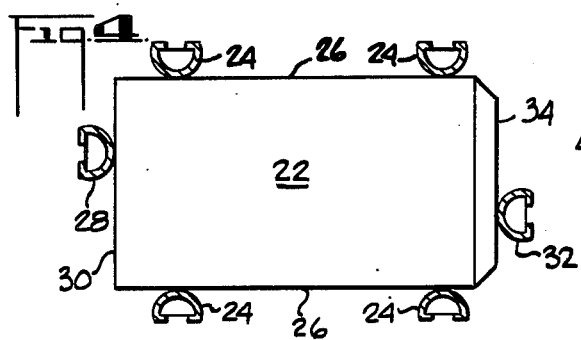
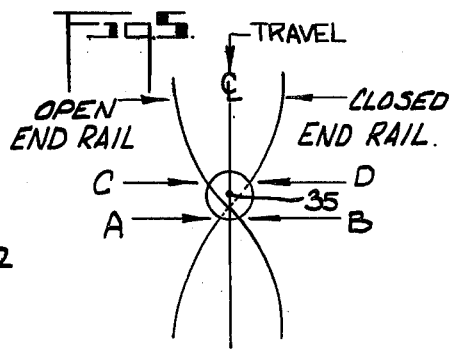
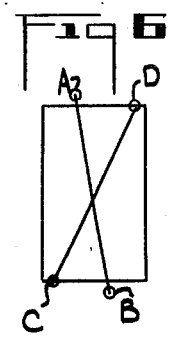
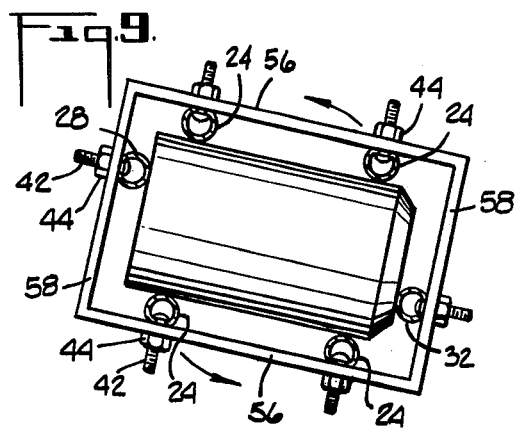
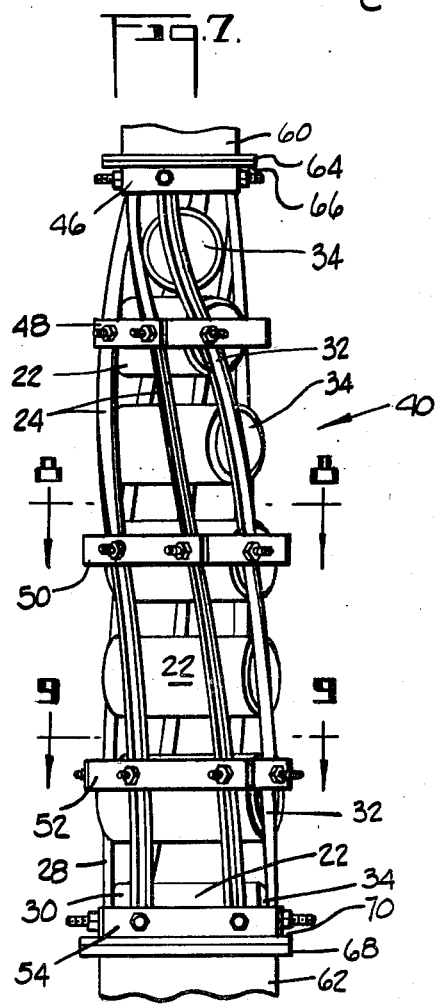
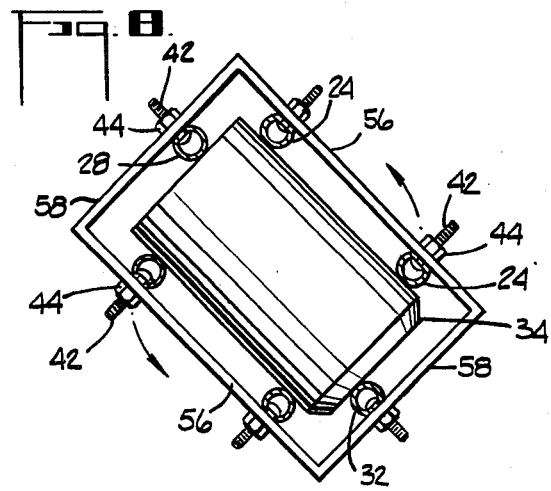

METHOD AND APPARATUS FOR CHANGING THE ORIENTATION OF CANS

FIELD OF THE INVENTION

This invention lies in the field of can conveying systems and in particular to imparting a twist, that is a change in orientation of the cans, as they are passed through the conveying system.

BACKGROUND OF THE INVENTION

There are many different methods and mechanisms for imparting a twist to cans as they are passed through a conveying system. One major difficulty in can twist mechanisms is the tendency for the can to get stuck and jam up the system. Most often it is the open end of the can that gets caught in a burr or nick in the rails which guide them through the can twist section of the conveying systems. The leading edge of the open end of the can will come into contact with a nick or burr on a guide rail and because it is relatively flexible will bend causing the can to turn and become stuck and thus causing a jamming of the conveying system. As a result of the jam, the conveying system must be stopped thus causing a delay in production.

It is an object of this invention to provide method and apparatus to impart a twist to cans in a conveying system to reduce or substantially eliminate the tendency for a can to get stuck in the can twist and cause a jamming of the cans in the conveying system.

It is a further object of this invention to provide method and apparatus for guiding cans through a can twist so that the tendency for the leading edge of the open end of the can to get caught in a nick or burr in a guide rail is eliminated.

SUMMARY OF THE INVENTION

The foregoing objects are accomplished in accordance with this invention by providing method and apparatus wherein the leading edge of the open end of the can never contacts a guide rail in the can twist of a conveying system. In the preferred embodiment of the invention, the leading edge of both the open end and the closed end of a can never contacts a guide rail in a can twist of a conveying system. This is accomplished by a relocation of the guide rail or rails that normally contact the open end and closed end of a can in a can twist. In a conventional can twist, the leading and trailing edges of both the open end and closed end of a can are in contact with the guide rails of the can twist. This contact is because the guide rails are located in a centered position of the can as it passes through the can twist. In accordance with this invention, the guide rail for contacting the open end and the guide rail for contacting the closed end of the can are offset to be in an offcentered position relative to the open and closed ends of a can so that the leading side of both the open end and the closed end of a can cannot come into contact with the guide rails as the can passes through the can twist. In the preferred embodiment, the guide rail for the open end of the can is offset in one direction and the guide rail for the closed end is offset in the opposite direction.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

FIG. 1 is a top plan view of part of a prior art system showing the relative location of the guide rails and a can as the can enters a can twist;

FIG. 2 is a view showing the relative location of the guide rails and a can where a can is midway through a prior art can twist;

FIG. 3 is a view showing the points of contact between the guide rails and a can of FIG. 2;

FIG. 4 is a top plan view of part of a system of this invention showing the relative location of the guide rails and a can as the can enters a can twist;

FIG. 5 is a view showing the relative location of the guide rails and a can when a can is midway through a can twist of this invention;

FIG. 6 is a view showing the points of contact between the guide rails and a can of FIG. 5;

FIG. 7 is a view of a system of this invention for reorienting a can through 90° in a counter-clockwise direction;

FIG. 8 is a plan view at lines 6—6 of FIG. 7 after the can has been reoriented through 45°; and, FIG. 9 is a plan view at lines 7—7 of FIG. 7 after the can has been reoriented through 67 $\frac{1}{2}$°.

DETAILED DESCRIPTION OF THE PREFERRED EMBODIMENT

Referring to the drawings, there is illustrated in FIGS. 1–3 a prior art system for reorienting a can as it passes through a portion of a conveying system commonly referred to as a can twist. In FIG. 1, there is a can 2 about to enter a can twist with guide rails 4 adapted to contact opposed portions of the body 6 of the can 2. A guide rail 8 for the top 10 of the can 2 and a guide rail 12 for the bottom 14 of the can 2 are illustrated to show the relative location of the guide rails and a can as the can enters a can twist. The relative location of a can midway through a can twist in a prior art can twist is shown in FIGS. 2 and 3. As shown in FIG. 2, the guide rails for the open end and the closed end of a can in the prior art can twist are located over the center 15 of the can so that the distance A-B is equal to the distance C-D as shown in FIG. 3. This means that the leading side 16 contacts the guide rails at points A and B and the trailing side 18 contacts the guide rails at points C and D. If the leading side 16 of the top 10 of a can 2 engages a nick or burr, on the guide rail 8 at point B, the leading side will fold back and turn and cause a jam.

The inventive concepts of this application are illustrated generally in FIGS. 4–6. In FIG. 4, there is a can 22 about to enter a can twist with guide rails 24 adapted to contact opposed portions of the body 26 of the can 22. A guide rail 28 for the top 30 of the can 22 and a guide rail 32 for the bottom 34 of the can 22 are illustrated to show the relative location of the guide rails and the can. As shown in FIG. 5, the guide rails for the open end and closed end of a can in a can twist of this invention are located at a distance from the center 35 of the can so that the distance C-D is greater than A-B. Since the distance between the guide rails for the open and closed ends of a can is the same throughout the twist, the leading side A-B will not contact the guide rails but the trailing side will contact the guide rails at points C and D. Since the distance between A-B is smaller, the leading portion of the can never contacts the guide rails. It should be noted that the point contact at C and D does not necessarily remain at the same points on the can since the can sometimes rotates as it passes through the twist. However, the relative location of the points C and D of contact remains the same as the can passes through the twist. The location of points C and D is dependent upon the distance between the center of the can and the guide rails. Thus, if the guide rails are superimposed on the end of the can, the guide rails would be spaced a predetermined distance from the center of the can. While FIG. 2 and 4 show the relative location of the guide rails and a can at a point midway through a can twist, this relative location as shown in FIGS. 2 and 4 exists during the entire passage of a can through a can twist. In the arrangement illustrated in FIG. 4, a can would be reoriented in a counter-clockwise direction. If the relative location of the guide rails 28 and 32 were reversed, the reorientation would be in a clockwise direction.

In FIGS. 7-9, there is illustrated a can twist 40 made in accordance with this invention. Guide rails 24 are connected by suitable means, such as bolt 42 and nut 44, to a plurality of open ended frames 46, 48, 50, 52 and 54. Each of the frames 46-54 is shaped generally in accordance with the shape of the can 22 and in the preferred embodiment has two long sides 56 and two short sides 58. The sides 56 and 58 may be secured to each other to form a fixed rigid frame as illustrated in FIGS. 6 and 7 or if desired they may be adjustably secured to each other (not shown) so that different shaped cans may be readily accomodated. In any such adjustable frame, the securing means would also be adjustable. The guide rail 28 is secured to one of the short sides 58 at an off-center location so that the top of the can will pass through the can twist as described above in relation to FIG. 5. The guide rail 32 is secured to the other short side 58 at an off-center location so that the bottom 34 of the can 22 will pass through the can twist as described above in relation to FIG. 5. Suitable means such as the bolts 42 and the nuts 44 secure the guide rails 28 and 32 to the sides 58. Suitable means such as a chute 60, are provided to feed cans to the can twist 40. Also, suitable means, such as chute 62, are provided to receive the cans as they exit from the can twist 40. The chute 60 has a flange 64 which is connected to a flange 66 on the frame 46 by suitable means (not shown). The chute 62 has a flange 68 connected to a flange 70 on the frame 54 by suitable means (not shown).

The passage of the cans 22 through the can twist 40 is illustrated in FIG. 7. The can twist 40 is designed to reorient the cans 22 through 90° in a counter-clockwise direction. A can 22 will enter the can twist 40 at frame 46 with the bottom 32 of the can lying in the plane of the drawing. When the can passes frame 48, it will have been reoriented through 22 ½° in a counter-clockwise direction. It will be rotated an additional 22 ½° at each frame 50, 52 and 54 so that when it passes through frame 54 it will have been rotated through 90° and the bottom 34 will be perpendicular to the plane of the drawing. Although the can twist 40 is shown rotating each can through 90°, it should be readily understood that can twists can be made in accordance with this invention which will reorient cans as many degrees as desired in either a clockwise or counter-clockwise direction.

In the preferred embodiment of the invention for reorienting cans through 90° in a counter-clockwise direction, the distance from frame 46 to frame 54 is about 24 inches with frames 46 to 54 being spaced from each other an equal distance. The outside diameter of the guide rails 24, 28 and 32 is about ⅜ of an inch and has a flat surface in engagement with the sides 56 and 58. The guide rails illustrated have arcuate surfaces which result in point contact with the trailing side of the cans. However, it is understood that this is for illustrative purposes only since the guide rails may have different surfaces for contact with the can. Thus, if the contacting surface is flattened, there will be a line contact at the trailing side. The center of the guide rail 32 is spaced about ⅜ of an inch below the center of the side 58 as shown in the drawing. The center of guide rail 28 is spaced ⅜ of an inch above the center of the side 58, as shown in the drawing. The distance from frame 46 to frame 54 can be varied as desired but usually is from about 6 inches to 48 inches. Also, the outside diameter of the guide rails 24, 28 and 32 may be varied as desired but usually is from about ⅛ to about 1 inch. The center of the guide rails may be offset from the center of its associated side from about ⅛ to about ½ of an inch. The foregoing dimensions are those generally associated with a tourist for soft drink or similar cans. As the dimensions of the cans increase, the dimensions of the twist will increase. However, it is to be understood that the inventive concepts disclosed herein are suitable for use in any twist such as those used with barrels.

The can twist of this invention has been described in relation to the preferred embodiment of the invention wherein both the guide rails have been relocated as shown in FIGS. 4 and 7-9. If desired, only one guide rail may be relocated.

While the preferred embodiments of the invention have been illustrated and described herein, it may be otherwise embodied and practiced within the scope of the following claims.

What is claimed is:

1. A method for changing the orientation of cans as they pass through a conveying system comprising:
   (a) providing a plurality of cans, each can having an open end, a closed end, and a body in a first portion of said conveyor system in a certain orientation;
   (b) feeding said cans to a twist section of said conveyor system, passing said cans through said twist section and changing said certain orientation of said cans as they pass through said twist section;
   (c) passing said cans through said twist section so that each can has a leading side and a trailing side as it passes through said twist section;
   (d) providing means for contacting the open end, closed end, and the body of each can as it passes through said twist section;
   (e) said means for contacting said open end contacting only the trailing side of the open end of each can as it passes through said twist section; and,
   (f) providing means in said conveying system for receiving said cans from said twist section in said changed certain orientation.

2. A method as in claim 1 and further comprising:
   (a) said means for contacting the closed end contacting only the trailing side of the closed end of each can as it passes through said twist section.

3. A method as in claim 2 wherein said changed certain orientation comprises:
   (a) rotating each can in a clockwise direction as it passes through said twist section.

4. A method as in claim 3 wherein said changed certain orientation comprises:
   (a) rotating each can in a counter-clockwise direction as it passes through said twist section.
5. A method as in claim 2 and further comprising:
   (a) rotating each can through 90°.
6. Apparatus for changing the orientation of cans as they pass through a conveying system comprising:
   (a) means for passing a plurality of cans through said conveying system, each can having an open end, a closed end, and a body, with said cans in a certain orientation in a first portion of said conveying system;
   (b) a twist section in said conveying system for changing said certain orientation of said cans as said cans pass through said twist section;
   (c) said twist section having means for guiding said cans during said passage therethrough so that each of said cans has a leading side and a trailing side;
   (d) said guiding means comprising means for contacting the open end, the closed end, and the body of each can as it passes through said twist section;
   (e) said means for contacting the open end of each can being located so as to contact only the trailing side of the open end of each can; and,
   (f) means in said conveying system for receiving said cans from said twist section in said changed certain orientation.
7. Apparatus as in claim 6 and further comprising:
   (a) said means for contacting the closed end of each can being located so as to contact only the trailing side of the closed end of each can.
8. Apparatus as in claim 7 and further comprising:
   (a) said guiding means rotating each can in a clockwise direction.
9. Apparatus as in claim 7 and further comprising:
   (a) said guiding means rotating each can in a counter-clockwise direction.
10. Apparatus as in claim 7 wherein said twist section comprises:
    (a) an elongated member;
    (b) means at one end of said member connected to a portion of said conveying system for feeding cans to said twist section;
    (c) means at the other end of said member connected to a portion of said conveying system for receiving cans passing from said twist section; and,
    (d) said guiding means connected to both said means at one end and said means at the other end of said member.
11. Apparatus as in claim 10 and further comprising:
    (a) said means at one end of said member comprising a first open ended enclosure formed by a plurality of sides;
    (b) said means at the other end of said member comprising a second open ended enclosure formed by a plurality of sides;
    (c) said first and second enclosures having corresponding sides; and,
    (d) said second enclosure having been rotated through a predetermined angle relative to said first enclosure so that if said first and second enclosures were superimposed, the sides of said second enclosure would form that predetermined angle with the sides of said first enclosure.
12. Apparatus as in claim 11 wherein said means for contacting the open end of each can comprises:
    (a) a rail extending between and connected to corresponding sides of said first enclosure and said rotated second enclosure;
    (b) said rail connected in an off-center location on each corresponding side of said first enclosure and said rotated second enclosure; and,
    (c) said off-center location is in a direction opposite to the direction in which said second enclosure was rotated.
13. Apparatus as in claim 12 and further comprising:
    (a) said first and second enclosures are rectangular in cross section having two long sides and two short sides; and,
    (b) said rail is connected at said off-center positions on corresponding short sides.
14. Apparatus as in claim 11 wherein said means for contacting the closed end of each can comprises:
    (a) another rail extending between and connected to corresponding sides of said first enclosure and second rotated enclosure;
    (b) said another rail connected in an off-center location on each corresponding side of said first enclosure and said rotated second enclosure; and
    (c) said off-center location is in a direction opposite to the direction in which said second enclosure was rotated.
15. Apparatus as in claim 14 and further comprising:
    (a) said first and second enclosures are rectangular in cross section having two long sides and two short sides; and
    (b) said another rail is connected at said off-center positions on corresponding short sides.
16. Apparatus as in claim 15 and further comprising:
    (a) a plurality of rails connected to each corresponding long side of said first enclosure and said rotated second enclosure.
17. Apparatus as in claim 16 and further comprising:
    (a) locating said first enclosure in a horizontal plane;
    (b) locating said second enclosure in a horizontal plane parallel to said horizontal plane of said first enclosures; and,
    (c) said predetermined angle is about 90° in either a clockwise or counter-clockwise direction.
18. Apparatus for changing the orientation of cans as they pass through a conveying system comprising:
    (a) means for passing a plurality of cans through said conveying system, each can having an open end, a closed end, and a body, with said cans in a certain orientation in a first portion of said conveying system;
    (b) a twist section in said conveying system for changing said certain orientation of said cans as said cans pass through said twist section;
    (c) said twist section having means for guiding said cans during said passage therethrough so that each of said cans has a leading side and a trailing side;
    (d) said guiding means comprising means for contacting the open end, the closed end, and the body of each can as it passes through said twist section;
    (e) said means for contacting the open end of said can being located so that if said means were superimposed on said open end of said can, said means are always spaced a distance from the center of said can; and,
    (f) means in said conveying system for receiving said cans from said twist section in said changed certain orientation.
19. Apparatus as in claim 18 and further comprising:

(a) said means for contacting the closed end of said can being located so that if said means were superimposed on said closed end of said can, said means are always spaced a distance from the center of said can.

20. Apparatus as in claim 19 wherein said twist section comprises:
    (a) an elongated member;
    (b) means at one end of said member positioned to receive each can in a certain orientation comprising a first open ended enclosure formed by a plurality of sides;
    (c) means at the other end of said member positioned to pass each can out of said twist section in a changed certain orientation comprising a second open ended enclosure formed by a plurality of sides.

(d) said first and second enclosures having corresponding sides;
(e) said second enclosure having been rotated through a predetermined angle relative to said first enclosure so that if said first and second enclosures were superimposed, the sides of said second enclosure would form that predetermined angle with the sides of said first enclosure.
(f) said first and second enclosures are rectangular in cross section with two long sides and two short sides; and,
(g) guide rails for contacting said open end and said closed end of each can connected at off-center positions on corresponding short sides; and
(h) said off-center locations are in a direction opposite to the direction in which said second enclosure was rotated.

* * * * *